(12) United States Patent
Klein

(10) Patent No.: US 10,066,870 B2
(45) Date of Patent: Sep. 4, 2018

(54) PROCESS AND PLANT FOR SEPARATING A GAS MIXTURE

(71) Applicant: Bernd Klein, Munich (DE)

(72) Inventor: Bernd Klein, Munich (DE)

(73) Assignee: Linde Aktiengesellschaft, Munich (DE)

( * ) Notice: Subject to any disclaimer, the term of this patent is extended or adjusted under 35 U.S.C. 154(b) by 71 days.

(21) Appl. No.: 15/271,633

(22) Filed: Sep. 21, 2016

(65) Prior Publication Data
US 2017/0082358 A1   Mar. 23, 2017

(51) Int. Cl.
| F25J 3/02 | (2006.01) |
| B01D 53/22 | (2006.01) |
| C01B 3/50 | (2006.01) |
| C01B 32/40 | (2017.01) |

(52) U.S. Cl.
CPC .......... *F25J 3/0261* (2013.01); *B01D 53/229* (2013.01); *C01B 3/501* (2013.01); *C01B 3/506* (2013.01); *C01B 32/40* (2017.08); *F25J 3/0223* (2013.01); *F25J 3/0252* (2013.01); *F25J 3/0271* (2013.01); *C01B 2203/146* (2013.01); *F25J 2200/70* (2013.01); *F25J 2205/04* (2013.01); *F25J 2205/40* (2013.01); *F25J 2205/80* (2013.01); *F25J 2215/02* (2013.01); *F25J 2245/02* (2013.01)

(58) Field of Classification Search
CPC ...... F25J 3/0261; F25J 3/0271; F25J 2205/80; F25J 2210/18; F25J 2205/04; F25J 2215/14; B01D 53/229; C01B 3/501; C01B 3/506; C01B 3/50; C01B 32/40
See application file for complete search history.

(56) References Cited

U.S. PATENT DOCUMENTS

| 4,717,407 A * | 1/1988 | Choe .................... B01D 53/229 |
| | | 210/500.21 |
| 6,173,585 B1 * | 1/2001 | Billy ....................... C01B 3/506 |
| | | 62/624 |
| 6,428,606 B1 * | 8/2002 | Gottschlich .......... B01D 53/225 |
| | | 95/39 |
| 6,648,944 B1 * | 11/2003 | Baker .................. B01D 53/225 |
| | | 95/39 |
| 2015/0300734 A1 * | 10/2015 | Davidian ............. B01D 53/002 |
| | | 62/624 |

* cited by examiner

*Primary Examiner* — Brian King
(74) *Attorney, Agent, or Firm* — Philip H. Von Neida

(57) ABSTRACT

A process and plant are proposed for separating a feed mixture predominantly or exclusively containing carbon monoxide and hydrogen, in which the feed mixture is subjected to a cryogenic separation process in which a carbon monoxide-rich liquid and at least one residual gas mixture which is depleted in carbon monoxide and enriched in hydrogen, in comparison with the feed mixture, are formed. It is intended that the at least one residual gas mixture is subjected to a membrane separation process in which at least one hydrogen-rich permeate and at least one carbon monoxide-rich retentate are formed, wherein the or at least one of the carbon monoxide-rich retentates is recirculated to the cryogenic separation process.

11 Claims, 2 Drawing Sheets

PROCESS AND PLANT FOR SEPARATING A GAS MIXTURE

CROSS REFERENCE TO RELATED APPLICATIONS

This application claims priority from German Patent Application DE 102015012317.3 filed on Sep. 23, 2015.

BACKGROUND OF THE INVENTION

The invention relates to a process and a plant for separating a feed mixture predominantly or exclusively containing carbon monoxide and hydrogen in which the feed mixture is subjected to a cryogenic separation process in which a carbon monoxide-rich liquid and at least one residual gas mixture which is depleted in carbon monoxide and enriched in hydrogen, in comparison with the feed mixture, are formed.

High-purity carbon monoxide is usually obtained by means of cryogenic separation processes from synthesis gas that is customarily prepared via a catalytic conversion, partial oxidation, autothermal reforming and/or steam reforming of coal or coke, natural gas and/or hydrocarbonaceous feeds.

In EP 0 130 284 A2, a process is described for obtaining pure carbon monoxide from a feed mixture that still principally contains hydrogen and carbon monoxide after other components such as methane and nitrogen are separated off. The feed mixture is compressed, freed by adsorption from carbon dioxide and water that are still present, and cooled until the predominant part of the carbon monoxide has condensed. The remaining gaseous fraction is warmed and given off, and the condensed carbon monoxide is expanded for outgassing hydrogen that is dissolved therein. One part of the remaining carbon monoxide is vaporized, and one part is delivered as product.

A process of the type described therefore comprises a cryogenic separation process having a first separation step and a second separation step. In the first separation step, the predominant part of the carbon monoxide is condensed out, with non-condensed residue remaining (customarily designated "crude hydrogen", in the context of the present application, also as "first" residual gas mixture). In the second separation step, the condensed carbon monoxide is expanded in such a manner that the dissolved hydrogen outgasses and a further gas mixture is formed thereby (usually denoted "flash gas", in the context of the present application, also as "second" residual gas mixture).

The first residual gas mixture formed in the first separation step still contains considerable amounts of carbon monoxide. In conventional processes, this first residual gas mixture is passed out of the process. The carbon monoxide present in the first residual gas mixture is therefore lost. Also, in the second separation step, certain amounts of carbon monoxide are transferred to the gas phase. In the second residual gas mixture also, therefore, not inconsiderable amounts of carbon monoxide are present. The content of carbon monoxide in the second residual gas mixture corresponds to the equilibrium at the top of a stripping column used in this case. Such carbon monoxide is also to be considered as a loss in conventional processes. The said losses in carbon monoxide decrease overall the carbon monoxide yield of a corresponding process or of a corresponding plant.

Against this background, the present invention sets itself the object of specifying a process and a plant for the separation of a feed mixture predominantly or exclusively containing carbon monoxide and hydrogen, by means of which process or plant the carbon monoxide losses explained may be decreased and thus higher carbon monoxide yields altogether may be achieved.

SUMMARY OF THE INVENTION

This object is achieved by a process and a plant for separating a feed mixture predominantly or exclusively containing carbon monoxide and hydrogen, in which the feed mixture is subjected to a cryogenic separation process (10) in which a carbon monoxide-rich liquid and at least one residual gas mixture which is depleted in carbon monoxide and enriched in hydrogen, in comparison with the feed mixture, are formed, characterized in that the at least one residual gas mixture is subjected to a membrane separation process (20) in which at least one hydrogen-rich permeate and at least one carbon monoxide-rich retentate are formed, wherein the or at least one of the carbon monoxide-rich retentates is recirculated to the cryogenic separation process (10).

Embodiments are in each case subject matter of the dependent claims and also of the description hereinafter.

Before the explanation of the features and advantages of the present invention, the fundamentals thereof and the expressions used will be explained.

With reference to processes and devices for producing synthesis gas, in particular with respect to partial oxidation, autothermal reforming (ATR) and steam methane reforming (SMR), reference may be made to relevant textbook articles such as the article "Gas production" in Ullmann's Encyclopedia of Industrial Chemistry, online edition 15 Dec. 2006, DOI 10.1002/14356007.a12_169.pub2.

The present application uses the expressions "pressure level" and "temperature level" for characterizing pressures and temperatures, whereby it needs to be stated that corresponding pressures and temperatures in a corresponding plant need not be used in the form of exact pressure and temperature values in order to implement the inventive concept. However, such pressures and temperatures typically vary in certain ranges which lie, for example, ±1%, 5%, 10%, 20% or even 50% about a mean value. Corresponding pressure levels and temperature levels can lie in disjoint ranges or in ranges which overlap one another. In particular, for example pressure levels include unavoidable or expected pressure drops, for example owing to cooling effects. The same applies correspondingly to temperature levels. The pressure levels stated here in bar are absolute pressures.

Liquid and gaseous mixtures, in the language used here, can be rich or lean in one or more components, wherein "rich" can represent a content of at least 50%, 75%, 90%, 95%, 99%, 99.5%, 99.9% or 99.99% and "lean" can represent a content of at most 50% 25%, 10%, 5%, 1%, 0.1% or 0.01% on a molar, weight or volume basis. The expression "predominantly" can correspond to the definition of "rich". Liquid and gaseous mixtures can, in the language used here, in addition be enriched or depleted in one or more components, wherein these expressions relate to a corresponding content in a starting mixture, from which the liquid or gaseous mixture was obtained. The liquid or gaseous mixture is "enriched" when it contains at least 1.1 times, 1.5 times, 2 times, 5 times, 10 times, 100 times or 1000 times the content, and "depleted" when it contains at most 0.9 times, 0.5 times, 0.1 times, 0.01 times or 0.001 times the content, of a corresponding component, based on the starting mixture.

A "cryogenic separation process", in the language used here, is a single-stage or multistage thermal process for separating fluids which is carried out at a temperature level of below −100° C., in particular from −150 to −200° C., for example approximately −185° C. A cryogenic separation process can comprise the use of heat exchangers, condensation containers, stripping columns and/or valves, which are arranged in a cold box or cold chamber.

A "stripping column" in the language used here is a separation column which is used for expelling a more highly volatile component (here hydrogen) from a liquid mixture having a less highly volatile component (here carbon monoxide). Typically, the mixture for this purpose is expanded into the stripping column. With reference to the development of stripping columns (strippers) and other appliances for thermal separation methods, reference may be made to relevant text books (see, for example, Sattler, K.: Thermische Trennverfahren: Grundlagen, Auslegung, Apparate [Thermal separation methods: fundamentals, design, equipment], 3rd edition, 2001, Weinheim, Wiley-VCH).

If, here, a mixture is said to be formed "from" or "with the use" of another mixture, this is taken to mean not only that, to form the mixture, all of the other mixture is used, but it is also possible to use only a part of the other mixture, for example after separating off other components, for example condensates, and/or additional fluid in addition to the other mixture.

A "compression process" in the language used here is carried out by means of a single-stage or multistage compressor which is equipped for compressing at least one gaseous stream from at least one starting pressure at which said stream is fed to the compressor, to at least one final pressure at which said stream is withdrawn from the compressor. A compressor forms a structural unit which, however, can have a plurality of "compressor stages", in the form of piston, screw and/or paddle wheel and/or turbine arrangements (that is to say axial or radial compressor stages). In particular, corresponding compressor stages are driven by means of a shared drive, for example, a shared shaft.

To solve the problem described at the outset, the present invention proposes a process for separating a feed mixture predominantly or exclusively containing carbon monoxide and hydrogen, in which the feed mixture is subjected to a cryogenic separation process in which a carbon monoxide-rich liquid and at least one residual gas mixture which is depleted in carbon monoxide and enriched in hydrogen, in comparison with the feed mixture, are formed. In principle, this process, from which the present invention proceeds, corresponds to the prior art process explained at the outset such as is known, for example, from EP 0 130 284 A2 and in which the problems explained at the outset occur. In particular, in the context of the process according to the invention, first a condensation of the predominant part of the carbon monoxide from the starting mixture can also be carried out with a first residual gas mixture ("crude hydrogen") remaining. The condensate formed (here, as is also explained extensively below, denoted "intermediate fraction") can be expanded for outgassing the dissolved hydrogen and fed into a stripping column. As explained, in this case, a second hydrogen-rich residual gas fraction ("flash gas") that still contains carbon monoxide and the actual liquid carbon monoxide-rich product of the process, which here is also denoted "carbon monoxide-rich liquid", are formed.

The present invention provides for subjecting the at least one residual gas mixture to a membrane separation process in which at least one hydrogen-rich permeate and at least one carbon monoxide-rich retentate are formed. The carbon monoxide-rich retentate or at least one of the carbon monoxide-rich retentates, in the context of the present invention, is recirculated to the cryogenic separation process. In this manner, the carbon monoxide present in the at least one residual gas fraction (for example the first residual gas fraction, that is to say the crude hydrogen, and the second residual gas fraction, that is to say the flash gas) can be recovered and recirculated to the separation process. In this manner, the losses in the context of a corresponding process are reduced, and the carbon monoxide yield is correspondingly increased in this manner.

Membrane separation processes that are usable in the context of the present invention comprise, in particular, a plurality of membrane separation stages, as explained hereinafter. In particular pressure-driven membrane processes having polymer membranes are suitable for implementing the membrane separation stages.

Advantageously, the membrane separation process used in the context of the present invention comprises a first membrane separation step and a second membrane separation step, as addressed above. In the first membrane separation step, in this case, a first hydrogen-rich permeate and a first carbon monoxide-rich retentate are formed. In the second membrane separation step a second hydrogen-rich permeate and a second carbon monoxide-rich retentate are formed. In the context of the present application the expression "permeate" is taken to mean the components preferentially penetrating a membrane used in a corresponding membrane separation process or a membrane separation step of such a membrane separation process. A "retentate", in contrast, is retained by a corresponding membrane. In the present case, hydrogen, on account of its smaller molecular size, preferentially passes through a membrane used, but carbon monoxide is predominantly retained.

As in any separation process, corresponding membrane separation processes or the membrane separation steps thereof are also not achievable with any desired selectivity of separation, and so a part of the components predominantly passing over into the permeate (here hydrogen) always also passes over into the retentate. The same also applies correspondingly to the components predominantly passing over into the retentate which are also to a certain extent recovered in the permeate. For this reason, the use of two membrane separation steps is found to be particularly advantageous, which membrane separation steps are series-connected to one another in the manner described hereinafter.

It is particularly advantageous when the first hydrogen-rich permeate from the first membrane separation step is transferred from the first membrane separation step to the second membrane separation step. Advantageously, in this case, the two membrane separation steps are carried out at different pressure levels, in particular, the first membrane separation step is carried out at a first pressure level, preferably the pressure level of the feed mixture, and the second membrane separation step is carried out at a second pressure level below the first pressure level. If, as explained hereinafter, a stripping column is used in the cryogenic separation process, the second pressure level can be at the pressure level of the stripping column or below. In each of the membrane separation steps, a certain pressure drop results, but on account of the pressure difference between the first membrane separation step and the second membrane separation step it is possible to ensure that the permeate from the first membrane separation step can be transferred to the second membrane separation step without further compression and additional expenditure in terms of apparatus or energy.

As already explained, in the cryogenic separation process, advantageously, a first residual gas mixture and a second residual gas mixture can be formed, wherein the first residual gas mixture is fed to the first membrane separation step and the second residual gas mixture is fed to the second membrane separation step. The membrane separation steps in this manner can be charged with residual gas mixtures of different carbon monoxide and hydrogen concentrations. Thus, in particular, the first residual gas mixture can have a higher carbon monoxide content than the second residual gas mixture, and the first hydrogen-rich permeate can have a higher carbon monoxide content than the second hydrogen-rich permeate. The membrane separation steps can be specifically adapted to the carbon monoxide contents of the residual gas mixtures used, for example with respect to the membranes used and other process parameters. The first membrane separation step in this manner performs a preliminary separation and the second membrane separation step performs a fine separation.

It is particularly advantageous, if, as also in known processes, in the cryogenic separation process, first by partial condensation of the feed mixture to the first pressure level, i.e. at the pressure level at which the first membrane separation step is also carried out, in a separation container, with a first residual gas mixture remaining, a liquid intermediate fraction is formed. The first residual gas mixture thereby corresponds, as mentioned frequently, to what is termed the crude hydrogen of the known process explained at the outset.

Then, advantageously, the liquid intermediate fraction in the cryogenic separation process is expanded to an intermediate pressure level and fed into a stripping column from which the second residual gas mixture, that is to say the gas mixture that is customarily referred to as flash gas, and the carbon monoxide-rich liquid, that is to say the actual product of the process, are withdrawn. The intermediate pressure level and thereby the pressure of the stripping column are advantageously selected to correspond to the process conditions. In an advantageous standard process, for example the second pressure level can be adapted to the condensation course of the feed gas, since a reboiler of the stripper used is usually heated against the condensing feed mixture. The intermediate pressure level can be above the second pressure level or correspond thereto.

The carbon monoxide-rich liquid can then be further worked up in any desired manner.

In this manner, i.e. by the at first partial condensation of the feed mixture with the first residual gas mixture remaining, and the subsequent expansion into the stripping column with formation of the second residual gas mixture, the first and second residual gas mixtures can be provided having the explained different contents of carbon monoxide, and at different pressure levels, in such a manner that they then can be fed directly, or optionally after an expansion, to the first and second membrane separation steps.

Because the second residual gas mixture is produced in the stripping column at the intermediate pressure level, it is advantageously, before being fed to the second membrane separation step, expanded to the second pressure level, at which said membrane separation step is carried out when the latter is lower.

For heat recovery, it has proven to be particularly advantageous when the first residual gas mixture and the second residual gas mixture are warmed in counterflow to the feed mixture. In a corresponding cryogenic separation process, however, further refrigerants and/or cold streams can be used. For the heat exchange, in particular a plate heat exchanger which, for example, can be arranged together with the separation container and the stripping column in a cold box, can be used.

For treating the retentates, in the context of the invention, a plurality of different expedient possibilities are suitable, which are explained hereinafter.

In particular, the first and second carbon monoxide-rich retentates can be brought to the intermediate pressure level, combined, and fed into the stripping column. This proves to be particularly expedient, because in this case only the second carbon monoxide-rich retentate needs to be compressed slightly from the second pressure level to the intermediate pressure level. The first carbon monoxide-rich retentate can, in contrast, be expanded to the intermediate pressure level and/or the pressure level of the second residual gas mixture that is to be added.

A further advantageous possibility is to expand the first carbon monoxide-rich retentate to the intermediate pressure level and feed it into the stripping column, but to bring the second carbon monoxide-rich retentate to the first pressure level and combine it with the feed mixture. This permits a targeted consideration of the present process parameters. Depending on the carbon monoxide content of the feed mixture, an increase of its carbon monoxide content, for example, by feeding back the second carbon monoxide-rich retentate into the feed gas can be advantageous, because thereby a more favourable condensation behaviour can result. Feeding back into the feed gas can also be advantageous when the return amount for the stripping column is limited and thereby both retentates cannot be conducted into the stripping column.

Finally, the first and second carbon monoxide-rich retentates can also be brought to the first pressure level and then both can be combined with the feed mixture. Corresponding advantages have already been explained with reference to feeding back only the second retentate. In addition, this is the simplest interconnection which additionally requires the lowest control complexity.

In the case explained, in which the first and second carbon monoxide-rich retentates are increased in pressure to the first pressure level and combined with the feed mixture, with particular advantage, a shared compression process can be used, to which the first and second carbon monoxide-rich retentates are fed at different pressure levels. In particular, in this case, a multistage compressor can be used, to which the first carbon monoxide retentate is fed at an intermediate stage and the second carbon monoxide-rich retentate is fed upstream of the first compression stage.

The present invention also extends to a plant for separating a carbon monoxide- and hydrogen-containing feed mixture which has means which are equipped for subjecting the feed mixture to a cryogenic separation process in which a carbon monoxide-rich liquid and at least one residual gas mixture which is depleted in carbon-monoxide and enriched in hydrogen, in comparison with the feed mixture, is formed.

A corresponding plant is distinguished according to the invention by means which are equipped for subjecting the at least one residual gas mixture to a membrane separation process in which at least one hydrogen-rich permeate and at least one carbon monoxide-rich retentate are formed. In this case, means are provided which are equipped for recirculating the or at least one of the carbon monoxide-rich retentates to the cryogenic separation process.

Advantageously, a corresponding plant comprises all of the means equipped for carrying out a process described above and is constructed for carrying out a corresponding process. Therefore, reference is explicitly made to corresponding features and advantages which have already been described above.

The invention will be explained in more detail hereinafter with reference to the accompanying drawing which illustrates preferred embodiments of the invention.

DETAILED DESCRIPTION OF THE INVENTION

In the figures, elements having comparable function corresponding to one another are cited with identical reference signs and, for the sake of clarity, are not explained repeatedly. In the figures, steps and/or elements of a process are shown. The explanations, however, relate to a corresponding plant in a similar manner, and so, if, hereinafter, process steps are mentioned, the corresponding explanations also apply to plant components and vice versa.

Figure 1:
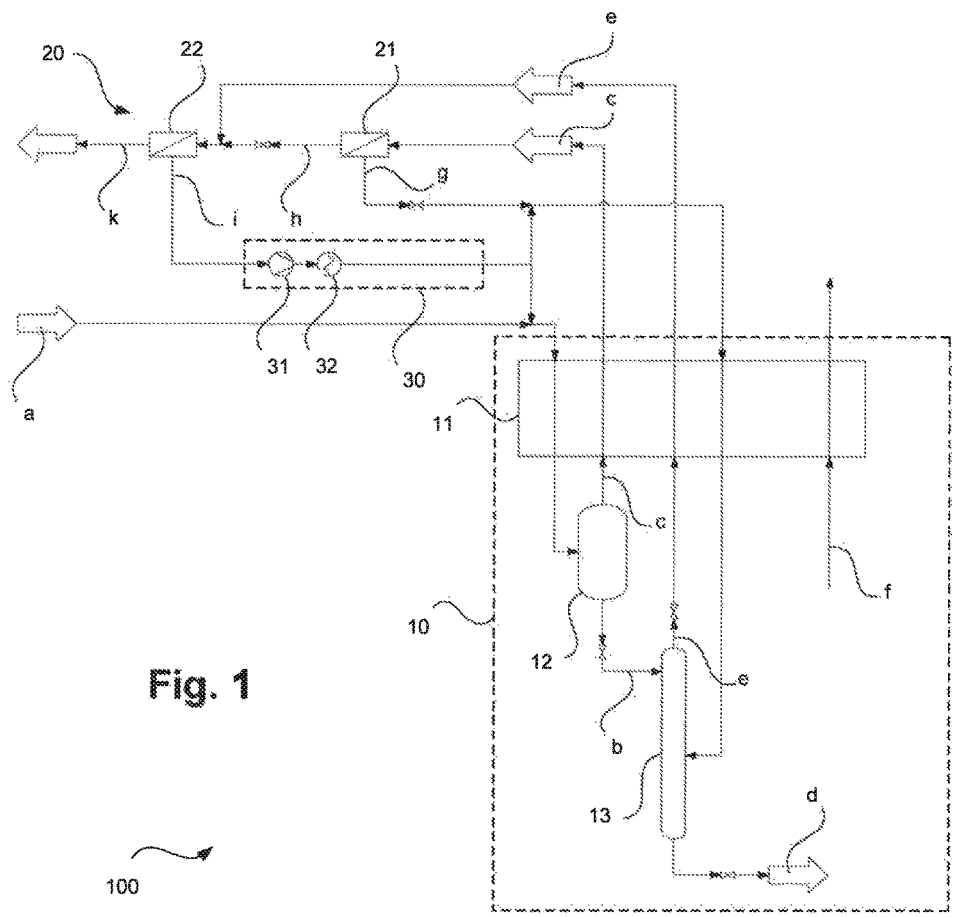
FIG. 1 illustrates a process according to an embodiment of the invention in the form of a simplified schematic flow plan.

In FIG. 1 a process according to an embodiment of the invention in the form of a schematic flow plan is illustrated and designated 100 overall. The process 100 comprises a cryogenic separation process which is designated 10 overall, a membrane separation process which is designated 20 overall, and a compression process which is designated 30 overall.

A feed mixture in the form of a stream a is fed to the cryogenic separation process 10 and is optionally combined with a further stream, as explained below. In the cryogenic separation process 10, the stream a is conducted through one or more heat exchangers 11, cooled thereby to a temperature level corresponding to the other process parameters and fed at a pressure corresponding to the pressure of the feed mixture a (here designated "first pressure level") into a separation container 12. In the separation container 12, at the pressure employed, a liquid fraction enriched in carbon monoxide separates out which is here termed "intermediate fraction".

The intermediate fraction can be withdrawn from the separation container 12 in the form of a stream b, expanded via a valve which is not shown and fed into a stripping column 13. In addition, a residual gas, which is here termed "first" residual gas and customarily termed crude hydrogen, is taken off from the separation container 12 in the form of the stream c.

In the stripping column 13 a carbon monoxide-rich liquid and a residual gas fraction are obtained from the liquid intermediate fraction which is fed into the stripping column 13 in the form of the stream b. The residual gas fraction from the stripping column 13 is here termed "second" residual gas fraction and is conventionally also termed flash gas. The carbon monoxide-rich liquid from the stripping column can be withdrawn therefrom in the form of the stream d and, for example, expanded and fed to further purification steps. The second residual gas fraction can be taken off from the stripping column in the form of the stream e and likewise be expanded.

The first residual gas fraction in the form of the stream c and the second residual gas fraction in the form of the stream e are warmed in the heat exchanger or heat exchangers 11 through which, in addition, optionally further cold streams, such as illustrated here by the stream f, are conducted. The first residual gas fraction in the form of the stream c and the second residual gas fraction in the form of the stream e are fed to the membrane separation process 20 or a first membrane separation step 21 and a second membrane separation step 22 in the membrane separation process 20. The first residual gas fraction c in this case is fed to the first membrane separation step 21, and the second residual gas fraction e is fed to the second membrane separation step 22.

In the first membrane separation step 21 a retentate is formed that can be conducted out of the first membrane separation step 21 in the form of the stream g. In addition, in the first membrane separation step 21 a permeate is formed that is conducted out of the first membrane separation step 21 in the form of the stream h, expanded via a valve which is not shown separately and fed to the second membrane separation step 22, to which the second residual gas fraction is also fed in the form of the stream e.

In the second membrane separation step 22, a retentate and a permeate are also formed, wherein the retentate can be conducted out of the second membrane separation step in the form of the stream i and the permeate in the form of the stream k. The permeate of the second membrane separation step 2, in the form of the stream k, is substantially hydrogen.

In the process 100 illustrated in FIG. 1, the first retentate of the first membrane separation step 21 in the form of the stream g is cooled in the heat exchanger 11 of the cryogenic separation process 10 and fed into the stripping column 13. For further use of the second retentate of the second cryogenic separation step 22 in the form of the stream i, there are two different possibilities. In both cases, the stream i and therefore the second retentate is fed to the compression process 30 and herein compressed in a compressor 31, which can be designed to be single- or multistage. Heat of compression is removed via a heat exchanger 32. Depending on the compression performed in the compression process 30, the stream i can then be combined with the stream a, or with the stream g and thereby the first retentate.

Figure 2:
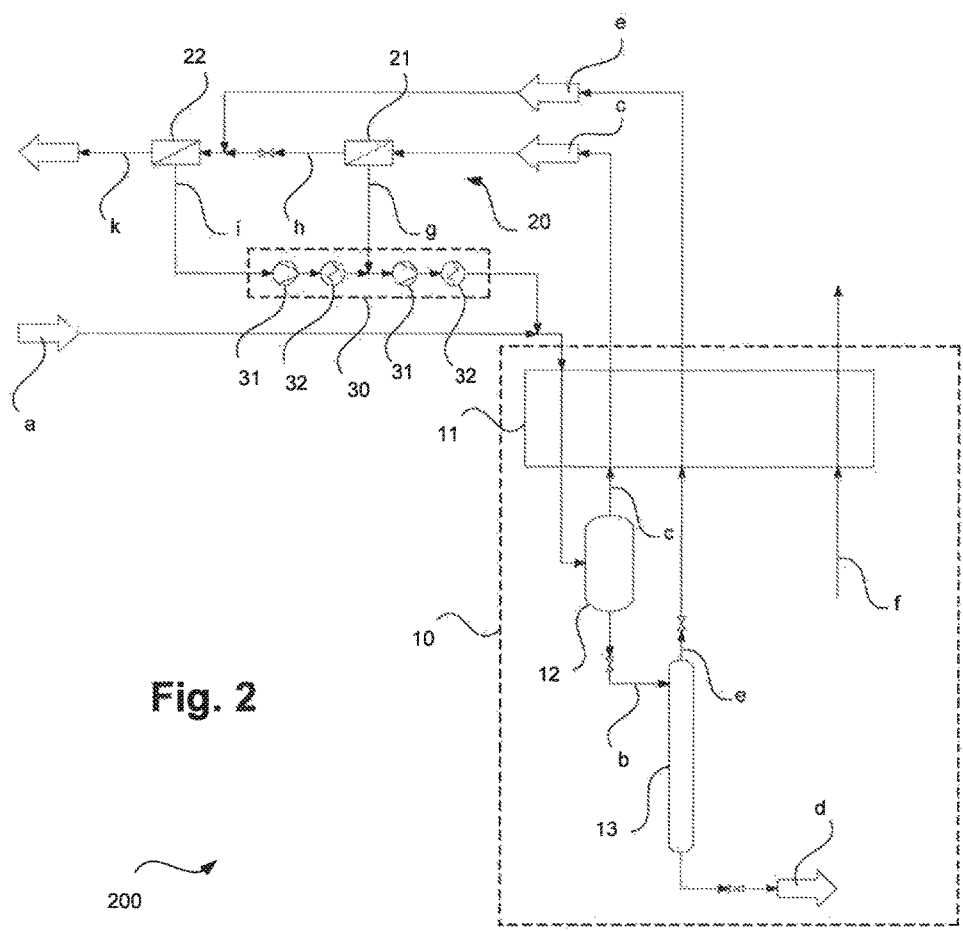
FIG. 2 illustrates a process according to a further embodiment of the invention in the form of a simplified schematic flow plan.

In the process 100 illustrated in FIG. 1, but also in the process 200 illustrated in FIG. 2 the separation container 12 is operated at a pressure level which is termed here "first" pressure level, the stripping column 13 is operated at a pressure level termed here "intermediate pressure level", the first membrane separation step 21 is operated at the first pressure level, and the second membrane separation step 22 is operated at a pressure level here termed "second" pressure level. The first pressure level in this case is above the second pressure level and the intermediate pressure level is between the first and second pressure levels. Alternatively, the intermediate pressure level can also correspond to the second pressure level, and an expansion of the second residual gas mixture in this case is dispensed with.

In FIG. 2, a process according to a further embodiment of the invention is illustrated and termed 200 overall. The process 200 illustrated in FIG. 2 differs from the process 100 illustrated in FIG. 1 substantially by the different treatment of the streams g and i, and thereby the first and second retentates, respectively. In the process 200 illustrated in FIG. 2, the first retentate in the form of the stream g and the second retentate in the form of the stream i are combined.

They are combined in this case within the compression process 30, in which here two compression stages 31 and 33 are provided each having downstream aftercoolers 32 and 34. The stream g is fed to an intermediate stage in the compression process 30. Overall, the streams i and g are compressed at the first pressure level, that is to say the pressure level at which the separation container 12 is operated, and combined at this pressure level with the feed stream a.

If, hereinbefore, the first membrane separation step 21 was said to be operated at the first pressure level, a person skilled in the art understands that, in a corresponding membrane separation step, an unavoidable pressure loss occurs, and therefore the stream g is no longer present at the first pressure level, and must therefore be recompressed.

What I claim is:

1. A process for separating a feed mixture predominantly or exclusively containing carbon monoxide and hydrogen, in which the feed mixture is subjected to a cryogenic separation process in which a carbon monoxide-rich liquid and at least one residual gas mixture which is depleted in carbon monoxide and enriched in hydrogen, in comparison with the feed mixture, are formed, characterized in that the at least one residual gas mixture is subjected to a membrane separation process comprising a first membrane separation step and a second membrane separation step, wherein in the first membrane separation step a first hydrogen-rich permeate and a first carbon monoxide-rich retentate are formed, and in the second membrane separation step, a second hydrogen-rich permeate and a second carbon monoxide-rich retentate are formed wherein the first carbon monoxide-rich retentate or the second carbon monoxide-rich retentate is recirculated to the cryogenic separation process, wherein the first hydrogen-rich permeate is transferred from the first membrane separation step, to the second membrane separation step and the first membrane separation step is carried out at a first pressure level at the height of the pressure level of the feed mixture and the second membrane separation step is carried out at a second pressure level below the first pressure level.

2. The process according to claim 1, in which, in the cryogenic separation process, a first residual gas mixture and a second residual gas mixture are formed, wherein the first residual gas mixture is fed to the first membrane separation step and the second residual gas mixture is fed to the second membrane separation step.

3. The process according to claim 2, in which the first residual gas mixture has a higher carbon monoxide content than the second residual gas mixture, and the first hydrogen-rich permeate has a higher carbon monoxide content than the second hydrogen-rich permeate.

4. The process according to claim 2, in which, in the cryogenic separation process, first by partial condensation of the feed mixture to the first pressure level in a separation container, with the first residual gas mixture remaining, a liquid intermediate fraction is formed.

5. The process according to claim 4, in which the liquid intermediate fraction in the cryogenic separation process is expanded to an intermediate pressure level and is fed into a stripping column from which the second residual gas mixture and the carbon monoxide-rich liquid are withdrawn, wherein the intermediate pressure level is selected from the group consisting of a pressure level between the first and second pressure levels and the second pressure level.

6. The process according to claim 5, in which the second residual gas mixture after the withdrawal from the stripping column is expanded to the second pressure level before being fed to the second membrane separation step.

7. The process according to claim 2, in which the first residual gas mixture and the second residual gas mixtures are warmed in counterflow to the feed mixture.

8. The process according to claim 5, in which the first and second carbon monoxide-rich retentates are brought to the intermediate pressure level, combined and fed into the stripping column.

9. The process according to claim 5, in which the first carbon monoxide-rich retentate is expanded to the intermediate pressure level and fed into the stripping column and the second carbon monoxide-rich retentate is elevated in pressure to the first pressure level and combined with the fed mixture.

10. The process according to claim 2, in which the first and second carbon monoxide-rich retentates are increased in pressure to the first pressure level and combined with the feed mixture.

11. The process according to claim 10, in which a shared compression process is used for the pressure elevation of the first and second carbon monoxide-rich retentates to the first pressure level.

* * * * *